Nov. 23, 1965 V. F. ZAHODIAKIN 3,219,088
DETACHABLE MECHANISM FOR RIGID NUTS AND THE LIKE
Filed May 23, 1963 2 Sheets-Sheet 1
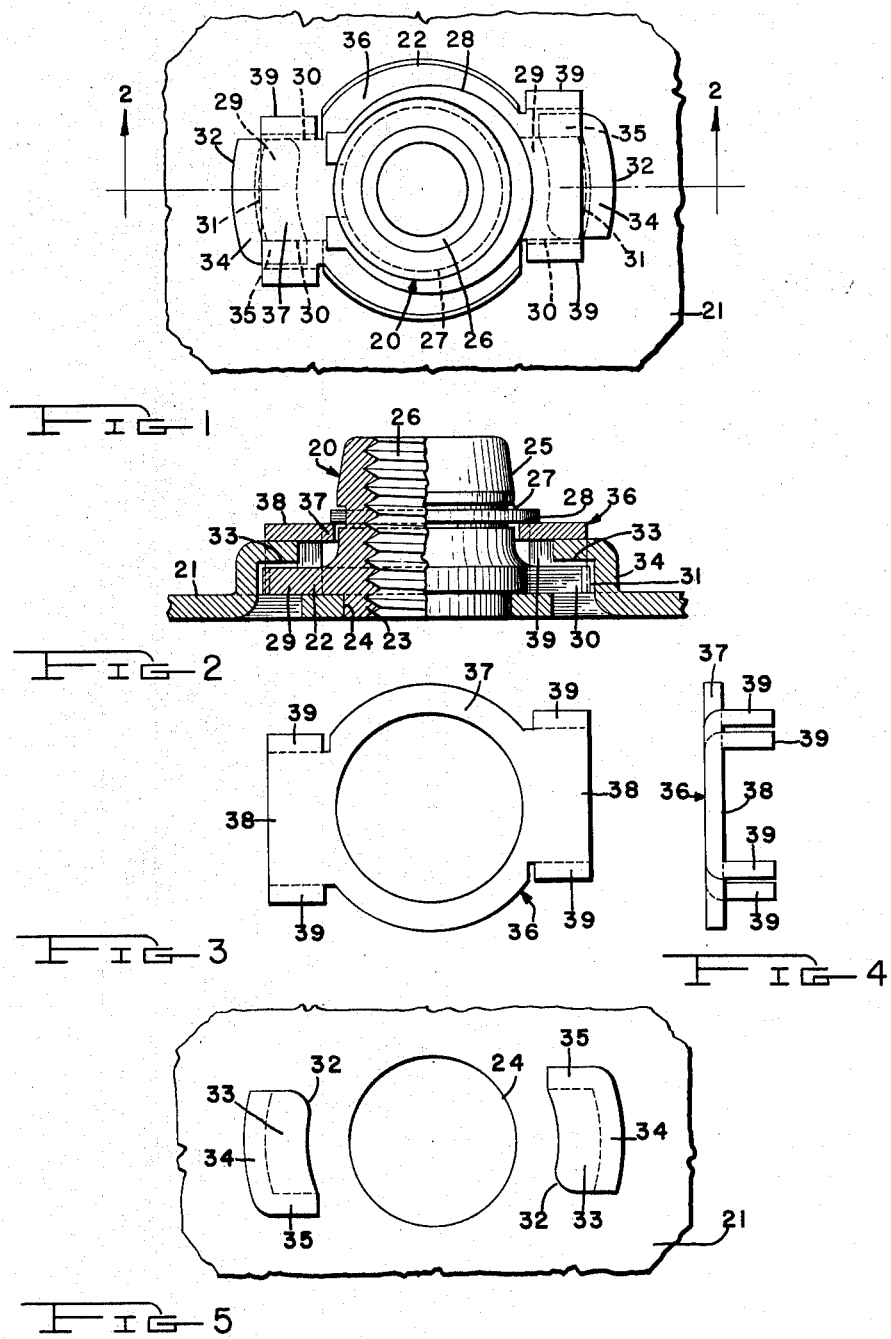
INVENTOR.
VICTOR F. ZAHODIAKIN
BY Howard P. King
ATTORNEY

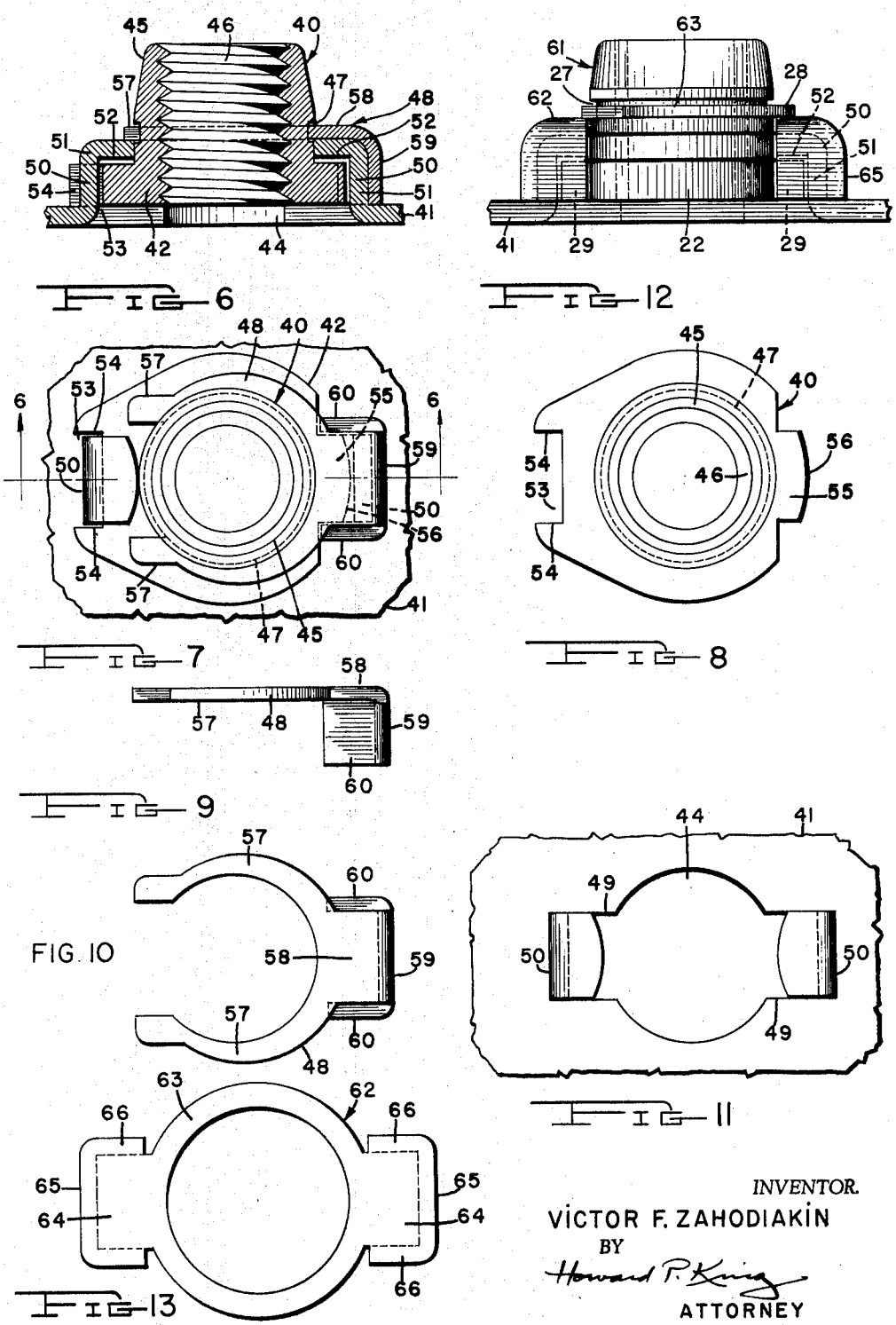

United States Patent Office 3,219,088
Patented Nov. 23, 1965

3,219,088
DETACHABLE MECHANISM FOR RIGID NUTS AND THE LIKE
Victor F. Zahodiakin, P.O. Box 689, Summit, N.J.
Filed May 23, 1963, Ser. No. 282,778
8 Claims. (Cl. 151—41.75)

This invention relates to releasably secured mounting mechanism having a variety of utilitarian purposes, such as for receiving a conventional bolt, stud or post, the mechanism including a modified form of conventional rigid nut or corresponding formations of related stud, post or other elements, too numerous to catalog herein, capable of direct releasable mounting as an associated part of and by the said mechanism to a basal member. The mechanism, for purpose of this disclosure, is arbitrarily illustrated in performing the function of releasably retaining a rigid threaded nut to a panel or basal member, such that the nut may be employed in bolting another member in juxtaposed relation to the first one mentioned, or other use may be made of said nut, or an equivalent substituted formation constituted as a part of or fixture applied to an element, requiring releasable attachment to a basal member.

Considered with respect to the arbitrarily selected disclosure herein, the specific problem solved by this invention is the need for detachably retaining a threaded nut from inadvertent escape from its appointed location, but at the same time to provide for readily releasing and replacing the nut or its equivalent at the option of the user. In the past, threaded nuts or equivalent devices have been prevented from escape from the members on which located, by means of welding, riveting, use of adhesive and other means effecting permanent attachment; however, when such a nut or threads thereof become damaged or stripped, it becomes a major operation to remove and replace the nut, and the present invention entirely eliminates such as obstacle.

In its broad aspect, therefore, the invention proposes a securely held but readily releasable nut and associated mechanism.

Otherwise expressed, the invention provides an improved mounting mechanism which is detachably yet positively mounted in juxtaposition to a basal member and retained in its appointed place without the use of rivets, screws, pins, welds, adhesives or the like, so as to avoid permanent attachment such that removal would introduce great expense and damage to said member in whole or in part.

Also, viewed broadly, a consideration of the invention is provision of an improved mechanism of detachable character which will not become inadvertently detached due to any causes involved in use, such as intense high frequency vibration, fatigue, impact, torque, extraneous forces, and so forth.

The invention further proposes an improved mechanism which is extremely strong, resistant to tension, shear and torque stresses.

The invention seeks and attains a simple and readily operable improved construction of extremely low cost to manufacture and install and maintain, not only on initial installation, but also upon removal, replacement and/or substitution.

Furthermore, the mechanism is constructed to enable the nut to be applied in its appointed place in a few seconds by use of a simple hand tool and correspondingly in only a few seconds to effect removal and replacement, or to make substitution of another nut.

An outstanding feature of one form of this invention is that there is only one single hole required to be made in the basal member and that a part of the metal displaced in forming said hole may be utilized as off-set retainers.

The construction and mode of manufacturer is rendered advantageous in limiting the necessary piercing of the metal and enabling use of a simple form of punch and die.

A detail object of the invention is to afford protection to the retainers constituted as parts stamped up from the basal member so as to keep the same from becoming jammed during usage, a circumstance which would render the removal and replacement of the nut difficult.

Other objects, advantages and beneficial structural features will appear to persons skilled in the art to which the invention appertains, as the description proceeds, both by direct recitation thereof and by implication from the context.

The novel features that I consider characteristic of my invention are set forth in the appended claims. The invention itself, however, as to its construction and its method of operation, together with additional objects and advantages, will be best understood from the following description of certain specific embodiments when read in conjunction with the accompanying drawings, in which FIGURE 1 is a plan of the invention in position of use on a panel or basal member;

FIGURE 2 is a longitudinal sectional view taken on line 2—2 of FIG. 1;

FIGURE 3 is a plan view of a certain lock or cap constituting one of the elements of the mechanism;

FIGURE 4 is an end view of said lock or cap;

FIGURE 5 is a plan view of a portion of the basal member involved in the present invention;

FIGURE 6 is a longitudinal sectional view taken on line 6—6 of FIG. 7, showing a modification of the invention;

FIGURE 7 is a plan of the modification of FIG. 6;

FIGURE 8 is a plan of the nut alone of the modified construction of FIGS. 6 and 7;

FIGURE 9 is an elevational edge view of a combined resilient open-side snap ring and lock shown alone and utilized in connection with the modification of FIGS. 6 and 7;

FIGURE 10 is a plan view of said combined snap ring and lock;

FIGURE 11 is a plan view of a portion of the basal member involved in the modification of FIGS. 6 and 7;

FIGURE 12 is an elevation of a further modified construction of the mechanism of this invention; and FIGURE 13 is a plan of the lock or cap utilized with this last-mentioned modification.

In the specific embodiment of the invention illustrated in said drawings, and giving attention initially to the showing thereof appearing on Sheet 1, an internally threaded rigid nut 20 and a sheet panel or basal member 21 have been arbitrarily selected for exemplification of the more general concept of removable attachment of one rigid body 20 to any desired basal member 21. For greater ease in following the description, reference hereinafter to those bodies as a nut and panel respectively, is merely for purpose of better clarity for understanding the invention, and is not to be considered as restrictive. One use for the invention would be to clamp several members together including member 20, by a bolt (not shown) passing through said members and screwed home in the nut 20. This, however, is only one of many possible uses.

In the illustrated form of the rigid body or nut 20 the same is shown formed with a peripheral flange 22 proximate to its bottom end adapted to be juxtaposed upon and rest flatwise on the upper surface of the basal member 21. Location of said nut 20 on said member 21 may be determined by providing an integral ferrule 23 on the under face of said flange 22, and in conjunction with said ferrule, providing a hole 24 in the basal member 21 to receive said ferrule. If a definitely fixed location is desired for the nut 20 on said member 21, the diameter of sizes and shapes of the ferrule 23 and hole 24 may be made alike, whereas, if a "floating" relation of the nut and basal member is desired, appropriate clearance for that purpose would be provided between the hole and the ferrule. The ferrule has a depth approximately the thickness of the basal member 21, so as preferably not to protrude below the same.

In the orientation illustrated in FIGS. 1 and 2, the major body or tower portion 25 of the nut is upstanding from said flange 22 and is integral therewith and with said ferrule 23 with which it is coaxial. Internal screwthreads 26 are provided within the nut, extending from the bottom of ferrule 23 to the top of tower portion 25 on a common axis. Intermediate of the top and bottom ends of said tower portion of the nut, the same is provided with an external peripheral groove 27 for receiving and holding a split ring 28 mentioned again hereinafter. In order to assist in spreading and applying the said ring, the upper peripheral margin of said tower portion 25 tapers downwardly outwardly from a smaller diameter at the top end of the nut to a larger diameter at the near edge of the groove.

From two opposite sides of nut flange 22 in a common plane therewith, there are diametrically opposite outwardly projecting protrusions or ears 29 formed integrally with said flange and of like thickness thereto. Each said ear has two parallel longitudinal edges 30 projecting outwardly from the perimeter of the flange, and each said protrusion has an arcuate end edge 31 at which said two longitudinal edges 30 terminate. The center of curvature of said arcuate edges coincides with the axial center of the nut threads. It may now be pointed out that the under face of said protrusions and flange are all in a common plane and are adapted to seat upon the upper face of basal member 21, the diameter of said flange being greater than the diameter of the ferrule 23 and ferrule-receiving hole 24 of the basal member. There is accordingly ample area for transmission of pressure from or to the nut and basal member. Adequate strength of the flange 22 and protrusions or ears 29 to resist the anticipated loads to be applied thereto is of course necessary, and according to the present showing, the same are made of greater thickness than the thickness of the basal member 21.

Movement of the nut 20 upwardly from said basal member 21 is prevented by means of pockets or other retainers 32 at appropriate locations to receive the outer ends of the nut protrusions or ears 29. One mode of providing such retainers is to strike them up integral with and the same thickness as the basal member 21 in a manner such that an off-set shoulder 33 is provided parallel to the upper face of said member and spaced therefrom adequately to receive the said ears thereunder. In striking up this shoulder, two edges are preferably retained with integral riser wall connections 34, 35 to the basal member, said walls likewise being integral one with the other at their meeting corner. One of said walls, as 34, is located to be opposite the end of ear 29 when said protrusion is under the shoulder, and the other wall 35 is toward and functions as a stop for a longitudinal edge 30 for the nut protrusions or ear 29 as the nut is rotated in a direction advancing said ear under said shoulder in approach to such stop at the far side of the shoulder. As viewed in FIG. 1, this assembling rotation is in a counter-clockwise direction. It will be observed that the offset shoulder and its two supporting walls not only form a pocket for reception of the respective protrusion of the nut, but also provide a very rigid structure highly resistive to deformation from blows or other rough usage, so as to avoid difficulty in rotating the nut protrusions 29 under or out from under the retainer shoulders 33 whenever occasion requires. It may also be remarked here, that when the protrusions are rotated to lie fully at their ends under said shoulders with one side edge of each engaging its respective stop wall 35 the open side edge of the shoulder and corresponding side edge of the protrusion under that shoulder are flush with each other.

A cap or lock 36 is provided to prevent reverse rotation of the nut unintentionally to avoid release of the protrusions from their assembled location under the shoulders 33. As may be clearly seen in FIGS. 3 and 4, said lock comprises a sheet metal annulus 37 with opposite side lobes 38 projecting therefrom in the same plane therewith, each lobe having at its lateral ends downwardly protruding flanks or detents 39. The spacing between the two detents on each lobe is as great as, plus adequate clearance, the width of the basal member retainer 32, or in other words, the width of the shoulder 33, inclusive of side wall 35. As there is a side wall 35 only at one side of each retainer and at diagonally opposite sides with respect to each other, it is necessary to stagger the lobes 38 and their detents 39 to conform thereto, and constructed in this manner, the lobes may be brought down into engagement with the tops of said retainers, the detents 39 then extending down past the sides of the retainer into opposition to the longitudinal edges 30 of the nut protrusions 29 at the otherwise open sides of the retainers. The presence of the annulus 37 between said lobes 38 enables the cap or lock 36 to be applied around the tower portion 25 of the nut, and it may now be said that the aforementioned groove 27 is located far enough above the nut flange 22 to admit presence of the retainer shoulder 33 and lock 36 below the level of the said groove permitting the split ring 28 to be introduced into the groove as a final assembly operation.

FIGS. 6–11, there is

Giving attention to the modification exemplified in FIGS. 6–11, there is again arbitrarily shown a rigid body in the form of an internally threaded nut 40 as well as a basal member 41. Here again the nut has a flange 42 projecting radially at the bottom of the nut and of adequate diameter so as to engage flatwise on the upper surface of member 41 in overlapping engagement with the same around the margin of a hole 44 through which a bolt (not shown) if used, may have entry through the member into the nut. Above said flange, the nut projects upwardly constituting its major body or tower portion 45 and within said tower portion and flange on a common axis are internal screw threads 46. Intermediate of the top and bottom ends of said tower portion of the nut, the same is provided with an external peripheral groove 47 for receiving and holding a cap in the form of an open side split ring 48 of special construction and also constituting a lock, all as hereinafter described.

Another important distinction of the instant construction over the one previously described herein, is that there is only a single hole 44 made in member 41 for any one nut, the said hole having the configuration of a double key-hole thereby providing diametrically opposed straightways 49 as extended portions of said hole. The metal struck from the member 41 in producing said straightways remains integral with said member at the far ends of the straightways and is bent up to form retainers 50 symmetrically disposed with respect to said hole 44. The specific retainers here shown comprise risers 51 projecting upwardly from the basal member 41 transversely to and at the end of the respective straight-ways 49 and at the top of the risers bend inwardly toward each other to form shoulders 52 parallel to the plane of said member and spaced far enough therefrom to admit nut flange 42 to be received thereunder.

Diametrically opposite portions of the nut flange 42 are shaped to engage said retainers for inter-engagement therewith. As a disclosure of this feature in the modification of FIGS. 6–11 under discussion, one of said diametric portions of the nut flange provides a notch 53 which is as wide as the riser 51 of a retainer 50 so that ends 54 of notch 53 will overlap at the side edges of said risers when sliding and rotating the flange into assembled position and function as detents thereat. The other diametric portion of the nut flange is formed as a lip or protrusion 55 likewise of equal width to that of the retainer and formed with an arcuate outer edge 56. In positioning the nut, the notched end of the flange is inserted under the appropriate retainer shoulder with the valley edge of the notch engaging at one end against the riser, as a fulcrum, whereupon the flange is swung to bring its protrusion end under the other retainer shoulder to a position of full registration of said protrusion under the shoulder. The valley edge of the notch will then be in parallelism to its proximate riser and both ends 54 of the notch will overlap the respective side edges of the riser to prevent lateral displacement of the flange. It may be here noted that the radial distance perpendicular to said valley edge of the notch to the thread axis, and the radial distance from the arcuate edge of protrusion 55 are equal to each other so that with the notch located in one retainer and the protrusion in the other retainer, said retainers being located symmetrical to hole 44, the axis of the nut will then be coincident with the center of said hole.

The aforementioned specially constructed cap or split ring 48 is also constructed to constitute it a lock to maintain the nut flange in its above described position of registration of protrusion 55 within retainer 50 under the shoulder 52 of which it has been inserted. Said split ring is stamped and bent from relatively thin sheet spring steel which, after being formed, is tempered to generate and maintain resiliency. It is of a character that can be formed into its ultimate shape by a single blow of an appropriate punch and die. As shown, said split ring 48 comprises two resilient legs 57 the free or toe ends of which are spaced apart interrupting an otherwise circular contour of the inner edges thereof, the radius of that contour being substantially the radius of the bottom of peripheral groove 47 heretofore described as provided in the tower portion 45 of the nut 40. The other or hip ends of the legs 57 are integral with each other and with a hip 58 in a common plane therewith. The far end of said hip from said legs is bent downwardly perpendicular to the said plane of the legs and hip, thereby providing a vertical web 59 having a depth corresponding to the height of the contiguous riser and a width commensurate to the width of said riser. Integral with and formed at the vertical side edges of said web 59 the same bends forwardly providing parallel flanks 60, 60 functioning as detents and of equal depth to said web and located below the side edges of said hip 58. The two flanks, with their connecting web, form a channel or three-wall pocket that is open in a forward direction which is the same direction in which the toe ends of the resilient legs are open. Consequently, the legs may be forced longitudinally thereof into the groove 47 of the nut, moving in the plane of said groove and resiliently spreading in making such entry, and during final movement into position of said legs, the said flanks or detents 60, 60 pass into lapping relation to the side edges of the retainers and consequently enclose the ends of the protrusion 55 of the nut flange which is thereby retained securely in appointed assembled condition under the retainer.

The modification shown in FIGS. 12 and 13, is a combination of basal member 41 and its retainers 50 fully described in discussion of FIGS. 6–11, but here utilizing a cap or lock and split ring separable from each other somewhat in the manner as illustrated by FIGS. 1–5. The rigid nut 61 here used is substantially the same as described for nut 20 in FIGS. 1 and 2, but omits the bottom ferrule. It includes peripheral groove 27 and split ring 28, as well as a bottom flange 22 larger than the hole 44 in the basal member 41, said flange having diametrically opposed protrusions 29 of symmetrical construction and identical to the protrusions 29 as shown in FIGS. 1 and 2, to be received under and in registration with shoulders 52 of said retainers 50.

The lock 62 utilized in the construction of FIGS. 12, 13, comprises an annulus 63 with two diametrically opposed lobes 64 projecting therefrom. The outer ends of these lobes are bent downwardly perpendicular to the plane of said lobes and annulus, thereby providing for each lobe a vertical web 65 having a depth corresponding to the height of the contiguous riser 51 and having a width commensurate with the width of said riser. Integral with and formed at the vertical side edges of said web 65, the same bends inwardly providing parallel flanks 66 functioning as detents, and the pair thereof forming an inwardly open channel at each side of the lock, said channel being also downwardly open. The cap or lock 62 by virtue of its annulus 63 may be placed downwardly around the nut 61, and in so doing, the flanks or detents 66 become located at the sides of the retainers 50 and the nut protrusions 29, thereby maintain registration of said protrusions under the shoulders 52 of said retainers. The end webs 65 on the lobes 64 keep the lock from longitudinal displacement. After the lock is thus placed, split ring 28 is applied in groove 27 completing the assembly.

It will be observed that all of the constructions herein disclosed provide a pre-punched body member from which retainers are stamped up to provide shoulders parallel to the surface of the member in appropriate spaced relation from said surface and from each other to admit a part of a pre-formed flange of a nut to be rotated under said shoulders. All constructions furthermore provide means for keeping the flange and nut from inadvertent releasing rotation after being properly positioned under said shoulders, and yet this means and nut may be readily removed when so desired without any damage either to said member or to the nut or to the associated securing mechanism, so the nut may be removed, returned or replaced as often as required in use.

I claim:

1. In combination, a basal member, diametrically opposite retainers on said member with shoulders spaced from said member, a nut having a lateral protrusion substantially the width of a respective said shoulder of one of said retainers applied in stationary position of retention under said respective shoulder, said nut having means opposite to said protrusion inter-engaging under the other said shoulder, and removably applicable positive holding means at least in part around said nut and in part at sides of and superposed over at least one of said retainers and depending into juxtaposition at a side of said protrusion thereby positively maintaining said nut from rotation from its said applied position of retention, and the assembly of nut and holding means having means retaining said assembly on the basal member.

2. A combination in accordance with claim 1, wherein said basal member provides a single hole between said retainers, said hole comprising a central opening with straightways at opposite sides thereof, said straightways terminating at ends thereof most distant from each other with said retainers rising thereat from said basal member and providing shoulders above said straightways.

3. A combination in accordance with claim 1, wherein said removably applicable holding means comprises a lock transverse to said nut and engaging at least said one retainer and having detents lapping at the sides of said one retainer and into opposition to said protrusion thereby preventing rotation both of said lock and of said nut, and said assembly-retaining means comprising a resilient split ring.

4. A combination in accordance with claim 1, wherein said removably applicable holding means comprises a lock having an annulus adapted to encircle said nut and having lobes projecting from opposite sides thereof and in the plane thereof, said lobes having detents integral therewith and depending therefrom and engaging sides of said retainers and protrusion and means opposite the protrusion thereby preventing rotation of said nut.

5. A combination in accordance with claim 1, wherein said removably applicable holding means comprises a lock having an annulus adapted to encircle said nut and having lobes projecting from opposite sides thereof and in the plane thereof, said lobes having detents integral with and at sides thereof depending at corresponding sides of and engaging the retainers and protrusion and means opposite the protrusion and preventing rotation of said nut, and said assembly-retaining means comprising a split ring overlying and releasably engaging said annulus and maintaining said lock assembled on the nut and retainers.

6. A combination in accordance with claim 1, wherein said nut provides a flange next to the basal member, said protrusion projecting radially from said flange and located under said one retainer, and said flange being notched on an opposite side from said protrusion and engaging thereat both under and at the sides of the other retainer, engagement of said protrusion under said one retainer enforcing engagement of said notch with the other retainer, and said retaining means comprising detents at the sides of said protrusion and its respective retainer.

7. A combination in accordance with claim 1, wherein said nut provides a flange next to the basal member and retention of the nut by the retainers is accomplished by means of said flange making engagement under said retainers, said flange being notched at one side and providing a protrusion at another side, said notch and protrusion making said engagement with respective retainers, and a split ring open at one side for insertion laterally onto said nut and having opposite from its open side depending detents slidable into lapping engagement with sides of both said protrusion and retainer thereat.

8. A combination in accordance with claim 1, wherein said removably applicable means comprises a lock having at least one pocket having a top wall and three side walls depending therefrom and applicable over a respective retainer and depending at corresponding three sides thereof to a level therebelow so as to be at sides of said protrusion thereby preventing said nut from rotating from said position of retention.

References Cited by the Examiner
UNITED STATES PATENTS

| | | | |
|---|---|---|---|
| 1,584,563 | 5/1926 | Kuykendall | 151—41.7 |
| 2,304,107 | 12/1942 | Leisure | 151—41.76 |
| 2,513,037 | 6/1950 | McLaughlin | 151—41.75 |
| 2,633,175 | 3/1953 | Desbrueres | 151—41.76 |

EDWARD C. ALLEN, *Primary Examiner.*